United States Patent
Edmonds et al.

(10) Patent No.: US 9,814,356 B2
(45) Date of Patent: Nov. 14, 2017

(54) DEVICE AND METHOD FOR THAWING A FROZEN ITEM IN A CONTAINER OF LIQUID

(71) Applicant: SMARTSY LLC, Atlanta, GA (US)

(72) Inventors: Ryan Edmonds, Atlanta, GA (US); Badsha Das, Alpharetta, GA (US)

(73) Assignee: Smartsy LLC, Atlanta, GA (US)

( * ) Notice: Subject to any disclaimer, the term of this patent is extended or adjusted under 35 U.S.C. 154(b) by 47 days.

(21) Appl. No.: 14/936,417

(22) Filed: Nov. 9, 2015

(65) Prior Publication Data
US 2016/0128515 A1    May 12, 2016

Related U.S. Application Data

(60) Provisional application No. 62/076,829, filed on Nov. 7, 2014.

(51) Int. Cl.
| | |
|---|---|
| A47J 43/044 | (2006.01) |
| A47J 43/04 | (2006.01) |
| A23L 3/365 | (2006.01) |
| A23B 4/07 | (2006.01) |

(52) U.S. Cl.
CPC .............. *A47J 43/044* (2013.01); *A23B 4/07* (2013.01); *A23L 3/365* (2013.01); *A47J 2043/04427* (2013.01)

(58) Field of Classification Search
USPC ......... 99/348, 468, 486, 487, 491, 493, 495, 99/501–505
See application file for complete search history.

(56) References Cited

U.S. PATENT DOCUMENTS

| | | | | |
|---|---|---|---|---|
| 4,197,018 A * | 4/1980 | Groen, Jr. | ........... | A47J 27/17 366/248 |
| 5,368,384 A * | 11/1994 | Duncan | ........... | A47J 43/044 219/227 |
| 5,617,774 A * | 4/1997 | LaVelle | ........... | A47J 36/165 366/251 |
| 6,280,284 B1 * | 8/2001 | Winefordner | ........... | A63H 29/18 446/162 |
| 2003/0177914 A1 * | 9/2003 | Schub | ........... | A47J 43/082 99/348 |
| 2004/0196736 A1 * | 10/2004 | Bordan | ........... | A47J 36/165 366/286 |

(Continued)

*Primary Examiner* — Michael Laflame, Jr.
(74) *Attorney, Agent, or Firm* — Morris, Manning & Martin, LLP; Daniel E. Sineway, Esq.

(57) ABSTRACT

A device for thawing frozen items in a container of liquid, the container having one or more sidewalls, the device including a housing, a motor disposed in the housing, a propeller coupled to the motor, and a fastener extending from the housing, the fastener detachably securable to the side wall of the container, the fastener oriented on the housing such that the propeller is positionable in the liquid when the fastener engages the side wall of the container. A controller can be operably connected to the motor, the controller including a thickness input, the controller programmed to determine an operational time period in response to the thickness input. The controller instructs the motor to rotate the propeller for the operational time period to help thaw the frozen item. A display can be operably connected to the controller. A method of thawing a frozen item is also disclosed.

17 Claims, 6 Drawing Sheets

(56) References Cited

U.S. PATENT DOCUMENTS

| | | | |
|---|---|---|---|
| 2006/0185524 A1* | 8/2006 | Krzywdziak | B44D 3/06 99/348 |
| 2008/0043569 A1* | 2/2008 | Moschetti | A47J 43/0711 366/279 |
| 2010/0180777 A1* | 7/2010 | Deppieri | A47J 27/56 99/348 |
| 2015/0009776 A1* | 1/2015 | Cheung | A47J 43/082 366/129 |
| 2017/0143165 A1* | 5/2017 | Heijman | A47J 43/0716 |

* cited by examiner

DEVICE AND METHOD FOR THAWING A FROZEN ITEM IN A CONTAINER OF LIQUID

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims the benefit of U.S. Provisional Patent Application Ser. No. 62/076,829, filed Nov. 7, 2014, the entire disclosure of which is incorporated herein by this reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

The present disclosure relates generally to a device and method for thawing frozen items such as, but not limited to, frozen foods.

Culinary schools teach that one of the fastest and safest method for thawing frozen items—particularly frozen meat—is to place the frozen item under a running cold liquid such as water. However, such a process can still take a substantial amount of time, usually between 30-60 minutes. Running cold water over a frozen item for 30-60 minutes can waste a lot of water and also monopolize the kitchen faucet, interfering with other food preparation, and is generally undesirable. An alternative method is to place the frozen item into a container filled with stagnate water, such a process potentially taking more time than the running water approach. In both approaches, the frozen item must be regularly checked in order to ascertain whether the frozen item has thawed.

There are other "quick thaw" devices, including defrosting trays which use a metal surface for heat transfer to defrost frozen items. However, metal defrosting trays potentially subject the frozen item to airborne bacteria and take longer to thaw than circulating water. Additionally, while a sous vide device could have the capability to thaw food by circulating water and controlling water temperature, such devices are costly and as such are prohibitively expensive for most users. Furthermore, none of the mentioned devices has any system or method to provide any indication as to when the thawing process is complete, other than the user manually checking the frozen item.

What is needed then are improvements in devices and methods for thawing frozen items.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is a device for thawing frozen items in a container of liquid, the container having one or more sidewalls. The device can include a housing, a motor disposed in the housing, a propeller coupled to the motor, and a fastener extending from the housing, the fastener detachably securable to the side wall of the container, the fastener oriented on the housing such that when the fastener engages the side wall of the container, the propeller is positionable in the liquid. A controller can be operably connected to the motor, the controller including a thickness input, the controller programmed to determine an operational time period in response to the thickness input and instruct the motor to rotate the propeller for the operational time period to help thaw the frozen item. In some embodiments, the controller can also include a start switch, the controller instructing the motor to rotate the propeller for the operational time period when the start switch is activated.

In some embodiments a display unit can be operably connected to the controller. In some embodiments, the display unit can display a numerical value corresponding to the thickness input as the user enters the thickness input into the controller. In some embodiments, the device can include a countdown timer that can calculate a remaining time value starting initially with the operating time period and counting backwards. In such embodiments, the display unit can display the remaining time for the operating period once the start switch is actuated and the motor begins rotating the propeller. In still other embodiments, the device can include an alert device, the controller programmed to actuate the alert device when the countdown timer and the remaining time value equals zero.

Another aspect of the present disclosure is a method for thawing a frozen item having a thickness in a container of liquid having one or more sidewalls, the method including the steps of providing a device including a housing with a fastener detachably securable to the side wall of the container, a motor disposed in the housing, a propeller coupled to the motor, and a controller operably connected to the motor; measuring the thickness of the frozen item; detachably securing the device to the sidewall of the container via the fastener with the propeller positioned in the liquid; providing a thickness input to the controller, the thickness input corresponding to the thickness of the frozen item; determining via the controller an operational time period in response to the thickness input; and instructing the motor to rotate the propeller for the operational time period via the controller.

One objective of the present disclosure is to thaw a frozen item by placing the item in a liquid and disturbing the liquid to help increase thermal convection around the frozen item.

Another objective of the present disclosure is to operate a motor driven propeller in a liquid to thaw a frozen item for a time period that corresponds or is proportional to the thickness of the frozen item.

Another object of the present disclosure is to help decrease thawing times for frozen items.

Numerous other objects, advantages and features of the present disclosure will be readily apparent to those of skill in the art upon a review of the following drawings and description of a preferred embodiment.

DETAILED DESCRIPTION

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing, or as otherwise described. A person of skill in the art will recognize that the apparatus can assume different orientations when in use.

Figure 6:
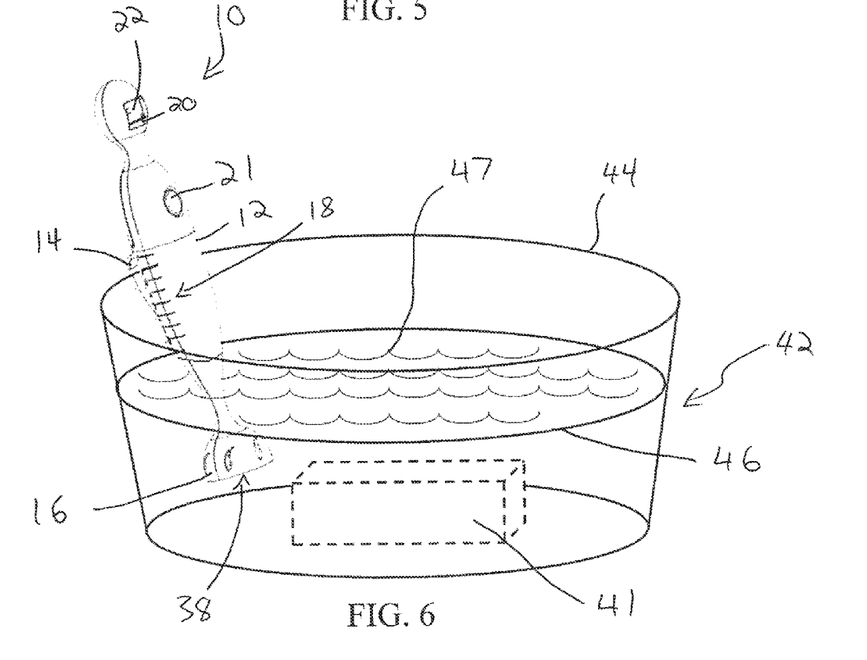
FIG. 6 is a perspective view of the device of FIG. 1 secured to a container of water.

One embodiment of a device 10 for thawing a frozen item in a container of water is shown in FIGS. 1-4. A container 42 can include one or more sidewalls 44, as shown in FIG. 6. Referring again to FIGS. 1-3, the device 10 includes a housing 12. The housing 12 in some embodiments can include multiple sections which can be assembled around other components of the device 10 during the manufacturing process. The housing 12 can be made from plastic or any other suitable material that is liquid safe. A motor 26 can be disposed in the housing 12. The device 10 can include a power source 30 which can selectively supply power to the motor 26. In some embodiments, the power source 30 can be one or more storage cells or batteries, such that power can be supplied to the device 10 without having to connect to a power grid. As such, the device 10 can be used outdoors or while camping where access to a power grid is limited. In other embodiments, the device 10 can include an electrical cord which can be plugged into a standard power grid to provide power to the device 10.

The motor can be any suitable motor for providing mechanical rotational power. In one embodiment, the motor is a 3 VDC motor (Model RX-FA280RA-20120, produced by Jieyang Taixin Micro Motor Co., Ltd. of Guangdong, China) having the following characteristics: nominal voltage—3V; no load speed—5800 rpm with 0.09 A current; maximum efficiency speed—4620 rpm with 0.35 A current; 13 g·cm (1.27 mN·m) torque; 0.6 W output. The power source 30 can be any suitable power source 30, including any type of battery or storage cell having various sizes, including but not limited to, AA, AAA, C, D, 3V, or 9 v batteries, etc. In some embodiments, multiple batteries or power cells can be connected in series together. In other embodiments, the batteries or power cells can be connected in parallel.

Figure 3:
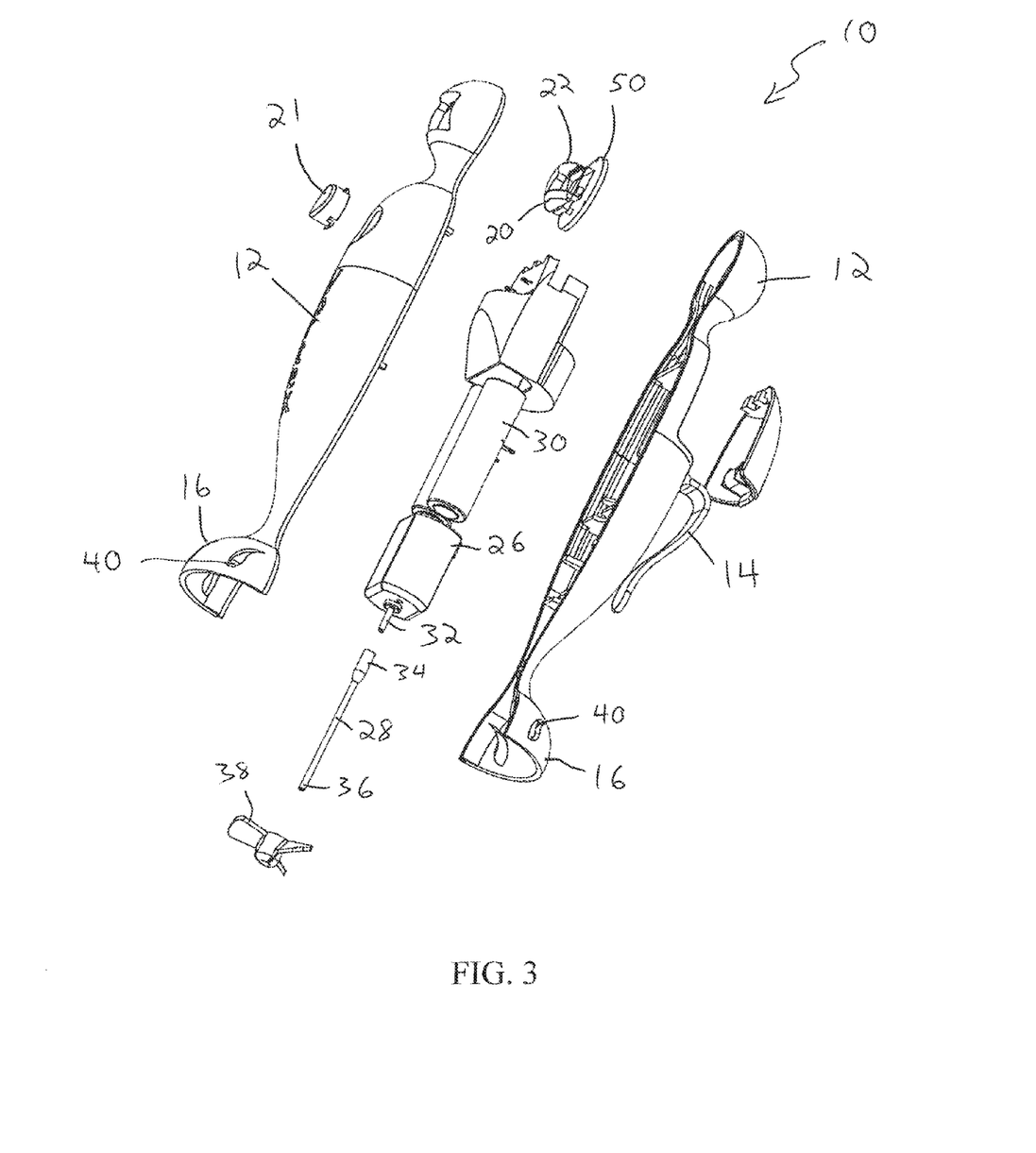
FIG. 3 is an exploded view of the device of FIG. 1.

A propeller 38 can be coupled to the motor 26 such that the motor 26 rotates the propeller 39 as power is supplied to the motor 26. In some embodiments, the propeller 38 can be coupled directly to the motor 26, the propeller 38 coupled to motor shaft 32 extending from the motor 26. Coupled can mean, among other things, that the two motor 26 and propeller 38 are connected by mechanical fasteners, friction fit, interference fit, welded, integrally formed, etc. In other embodiments, device 10 can include a drive shaft 28 extending from the motor 26, the propeller 38 coupled to the motor via the drive shaft 28. In such an embodiment, a first end 34 of the drive shaft 28 can be coupled to the motor 26 via the motor shaft 32, and a second end 36 of the drive shaft 28 can be coupled to the propeller 38. Having an additional drive shaft 28 extending from the motor 26 can help separate the propeller 38 from the motor 26 such that the propeller 38 can be positioned in a liquid such as water in a container while the motor 26 and other electronic components of the device 10 can remain out of the liquid and dry. In some embodiments, the propeller 38 and drive shaft 28 can be made of plastic or metal.

In some embodiments, the motor 26 and propeller 38 can be disposed in the housing 12 such that the housing 12 effectively covers a majority of the internal components of the device 10, which can help increase the aesthetic appearance of the device 10. In such embodiments, the housing 12 can have an open bottom section 16 which can allow the propeller 38 to disturb, churn, fan, agitate, or otherwise move a liquid in a container when the open bottom section 16 and the propeller are positioned in the liquid and the propeller 38 is rotated.

A fastener 14 can extend from the housing 12. The fastener 14 can be detachably securable to a sidewall 44 of a container 42 as shown in FIG. 6. The fastener 14 can be oriented on the housing 12 such that when the fastener 14 engages the sidewall 44 of the container 42, the propeller 38 and the open bottom section 16 of the housing 12 are positioned in the liquid 46. In some embodiments, the propeller 38 can be oriented to force liquid 46 in the container 42 in a direction generally perpendicular to a surface of the liquid 46, or downward, when the fastener 14 engages the sidewall 44 of the container 42 and the propeller 38 rotates. In other embodiments, the propeller 38 can be oriented to force liquid 46 in the container 42 in a direction that is angled with respect to a surface of the liquid 46 when the fastener 14 engages the side wall 44 and the propeller 38 rotates, such that the liquid 46 is encouraged to circulate around the container 42. The disturbance in the liquid 46 caused by the propeller 38 as it rotates can help increase the thermal convection of the liquid 46, which can help decrease the time in which the frozen item 41 takes to thaw. A disturbance of the liquid 46 is apparent by a ripple effect 47 on the surface of the liquid 46 in the vicinity of the bottom 16 of the device 10. The ripple effect 47 in some embodiments can eventually perpetrate the entire surface of the liquid 46 if the mechanical power provided to the propeller 38 is strong enough.

Referring again to FIGS. 1-3, in some embodiments, the propeller 38 can include three blades to help optimize liquid flow and disruption while minimizing the stress and load placed on the motor 26. In other embodiments, the number and profile of the propeller blades can be varied to produce different flow profiles and efficiencies. The power supplied to the motor 26 during operation can also be optimized such that the power provided to the motor 26 produces a sufficient amount of disturbance in the liquid via the propeller 38 to produce efficient thawing, while limiting unnecessary excess power to the motor 26. Such a supply of power can help improve the efficiency and prolong the life of the power source 30.

In some embodiments, the fastener 14 can be a clip extending from the housing 12 which can detachably receive the sidewall of the container. The clip 14 can be resilient such that when the clip receives the sidewall, the clip 14 can be biased to effectively clamp the device 10 to the sidewall of the container. In some embodiments, the clip 14 can have an outward curving top portion such that the clip 14 can readily slide over and receive a container sidewall having a lipped upper rim. In some embodiments, the fastener 14 can be integrally formed or molded with the housing 12 of the device 10. In other embodiments, the fastener 14 can be separate from the housing 12, and the fastener 14 can be mechanically connected, adhered, snap fitted, etc. to the housing 12.

In many conventional thawing devices, there is not a mechanism for determining or estimating the thawing time of the frozen item. A user must periodically check the frozen item to physically detect if the frozen item has sufficiently thawed. A relationship exists however between the thaw time for a frozen item and the thickness of the item. The thawing time is directly proportional to the thickness of the frozen item, a thicker item taking longer to thaw than a thinner item. Statistical and empirical data can be used to closely approximate the relationship between the thawing time and the thickness of a frozen item. For instance, in one approximation, the relationship between the thickness of a frozen item and the thawing time for that item when the item is immersed in disturbed, agitated, or flowing liquid can be exemplified in the following equation:

$$Y=4.2534*1.0545\textasciicircum(X*10)$$

wherein X represents the thickness of the frozen item in centimeters, and Y represents the thawing time associated with that frozen item in minutes. Using this or another similar model, the thickness of the frozen item can be used to approximate or estimate a thawing time if the item were to be placed in disturbed liquid, such as that shown in FIG. 6 when the propeller 38 of the device 10 is submersed in the liquid 46 and the propeller 38 is rotated.

Figure 4:
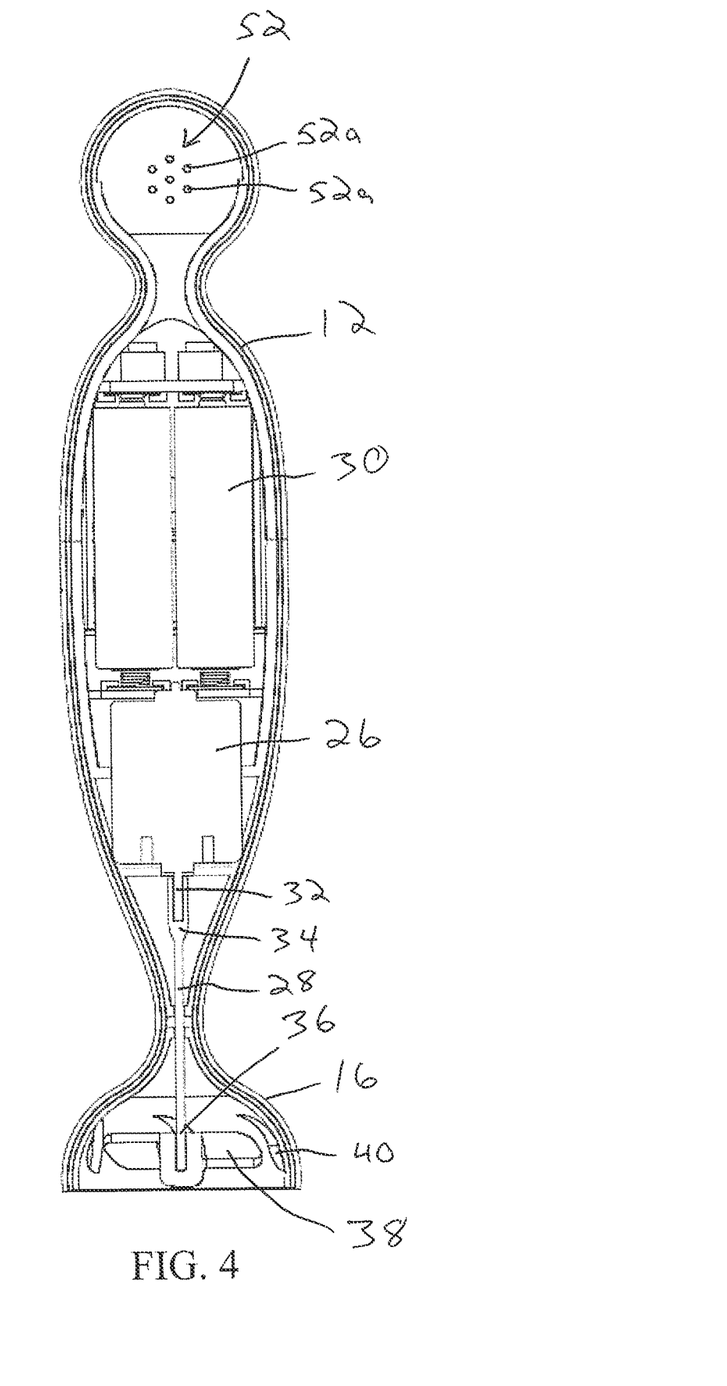
FIG. 4 is a cross sectional view of the device of FIG. 1.

Returning to FIGS. 3 and 4, the device 10 can include a controller 50 which can be operably connected to the motor 26, such that the controller 50 can control the operation of the motor 26. In some embodiments, the controller 50 can also be disposed in the housing 12 with the motor 26 and the power source 30. The power source 30 can be electrically connected to the controller 50 and the motor 26, the power source 30 configured to provide electrical power to the motor 26 when the controller 50 instructs the motor 26 to rotate the propeller 38. The controller 50, power source 30, and motor 26 can be operably connected using various electrical contacts, as shown in FIGS. 3 and 4. The controller 50 can be a microprocessor on a printed circuit board including appropriate device control circuitry, the device control circuitry operably connecting the controller 50 with the motor 26 as well as other components of the device.

In some embodiments, the controller 50 or microprocessor on the printed circuit board is programmed to instruct the power source 30 to send pulses of power signals ("Pulse Width Modulation") to the motor 26, such that the motor 26 does not spin continuously, but instead spins in pulses. In some embodiments, the Pulse Width Modulation can effectively cause the motor 26 to spin at approximately half its full speed. The Pulse Width Modulation can help reduce 1) the RPMs of the motor 26, 2) the amount of water disbursed by the propeller 38 in the liquid, and 3) the amount of power required to turn the propeller 38 at a speed fast enough to disturb the liquid to generate the required thermal convection effect for rapid thawing. In some embodiments, the pulses of the motor 26 are not visible to the naked eye, but the result can be significant battery life extension compared to running the motor 26 on full speed.

The motor 26 can be operated at any suitable Pulse Width Modulation frequency. The Pulse Width Modulation in some embodiments can run at 10,000 Hz. When the motor 26 is initially started, the motor 26 can be throttled to about 100% for a short time in order to break static friction and bring the liquid disturbance up to a desired level. Then the motor 26 can be throttled back to about 33% plus a correction factor based upon battery voltage. Battery voltage is measured using an analog-to-digital converter that is built into the microprocessor, and scaled to a range that can provide the remaining 67% throttle when the battery (e.g., 3V batteries) is depleted to about 1.6 volts. Battery voltage can range from 3V at full charge to 1.6V when nearly depleted in some embodiments.

The controller 50 can include a thickness input. The controller 50 can be programmed to determine an operational time period in response to the thickness input by inputting the thickness input into the above mentioned thickness to thaw time relationship model or another suitable algorithm derived from statistical or empirical data. The controller 50 can then instruct the motor 26 to rotate the propeller 38 for the operational time period in order to thaw a frozen item in a container of liquid when the fastener 14 engages the container and the propeller 38 is submerged in the liquid. As such, a thickness input can be provided to the controller 50, and the controller 50 can be utilized to help approximate a thawing time for a frozen item based on the thickness input.

In some embodiments, the controller 50 can also be programmed to stop the operation of the motor 26 at the end of the operational time period. As such, a user can enter the thickness input into the controller, and leave the container unattended without having to check on the frozen item, without fear of the device 10 running unnecessarily after the end of the operational time period and wasting power stored in the power source 30.

Figure 1:
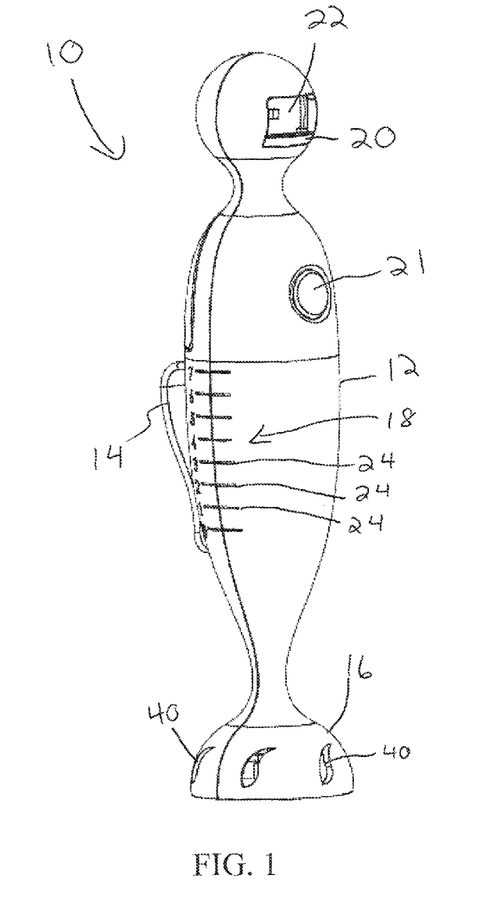
FIG. 1 is a front perspective view of an embodiment of a device for thawing frozen items in a container of liquid of the present disclosure.
Figure 2:
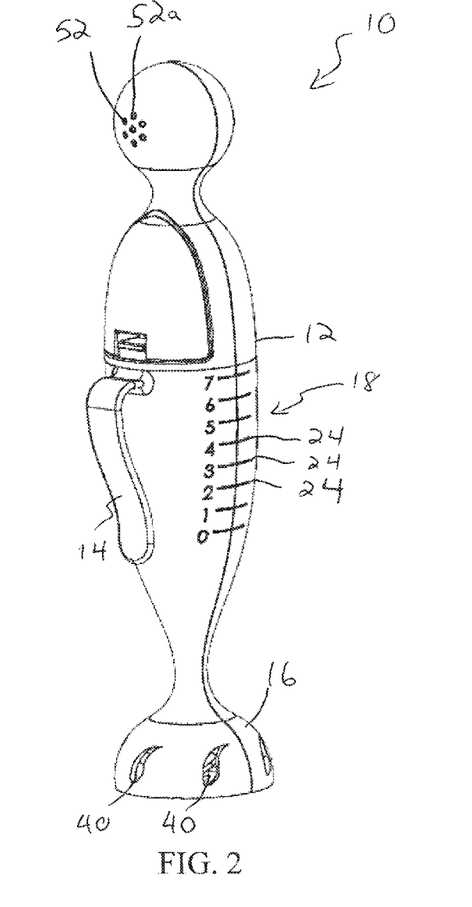
FIG. 2 is a back perspective view of the device of FIG. 1.

In some embodiments, as shown in FIGS. 1-3 the housing 12 includes, on an outer surface thereof, a scale 18. The scale 18 has a plurality of thickness indicia 24 for measuring the thickness of the frozen item. The plurality of thickness indicia 24 are shown as discrete sequential numbers 1-7 identifying various thickness levels. The range of sequential numbers used for the plurality of thickness indicia 24 can be increased or decreased from the range shown when more or less thickness indicia 24 are desired to be included in the scale 18. The plurality of thickness indicia 24 can be scaled in various measurement units, including in centimeters or inches. While numbers for the thickness indicia 24 are appropriate as the thickness indicia 24 represent a measurement of thickness of the frozen item, in other embodiments any appropriate symbol or marking, including letters, can be associated with the various thickness indicia 24 to denote various thickness levels. In still other embodiments, the numbers associated with the plurality of indicia 24 can be equivalent to thawing time estimates associated with the varying levels of thickness (i.e. 5, 10, 15, 20, etc). Having a scale 18 located directly on the housing 12 can allow a user to conveniently measure the thickness of the frozen item without the use of an additional measurement tool, and subsequently enter the corresponding thickness input into the controller.

The controller 50 can be programmed to include a discrete number of selectable thickness inputs, each selectable thickness input associated with a corresponding thickness indicia 24 on the scale 18. When the thickness indicia 24 are discrete sequential numbers, the selectable thickness inputs on the controller 50 can also be identified on the controller 50 using discrete sequential numbers, the number associated with each thickness indicia being equal to the number of the corresponding thickness input on the controller 50. As such, a user can measure the thickness of a frozen item on the scale 18, identify a thickness indicia 24 associated with the frozen item, and then readily select and enter the thickness input on the controller 50 that corresponds to the identified thickness indicia 24 by selecting the thickness input on the controller 50 with the matching number as the identified thickness indicia 24.

In some embodiments, the device 10 can include can include a push button 20 disposed on the housing 12 and operably connected to the controller 50. The push button 20 can be selectively depressed in order to vary the thickness input provided to the controller 50. In some embodiments, the controller 50 can be programmed to detect a number of depressions of the push button 20, the number of depressions of the push button 20 corresponding to the number associated with a particular thickness input. As such, a user can measure the thickness of the frozen item on the scale 18, identify a thickness indicia 24 associated with the frozen item, and the user can depress the push button a number of times corresponding to the identified thickness indicia 24 in order to enter the corresponding thickness input into the controller 50. The controller 50 can then determine the operational time period based on the thickness input level. In other embodiments, the device 10 can include any suitable input device for varying the thickness input provided to the controller 50, including but not limited to a numbered key pad wherein a user can enter the thickness input into the controller 50 by pressing the numbered key corresponding to the identified thickness indicia 24.

In some embodiments, the controller 50 can automatically instruct the motor 26 to rotate the propeller 38 for the operational time period upon the user entering the thickness input into the controller 50. In other embodiments, the controller 50 can include a start switch 21 disposed on the housing 12 and operably connected to the controller 50, the controller 50 instructing the motor 26 to rotate the propeller 38 when the start switch 21 is actuated. The start switch 21 can be disposed on the outer surface of the housing 12. As such, a user can measure and input the thickness of the item, place the item in the liquid, secure the device 10 to the container side wall, and then actuate the start switch 21 to begin the operational time period. The start switch 21 can be any suitable switch, including but not limited to a push button switch or a flip switch.

FIGS. 1-2 show the housing 12 in detail. The housing 12 in some embodiments can be shaped to look like a robot or humanoid, resembling a head, body and heart, and designed so that it will sit upright on a countertop. The size and profile of the housing 12 can be based on the "divine proportion" or "golden ratio/golden mean/logarithmic spiral" to help increase the aesthetic appearance of the housing 12 (i.e. if you apply the spiral at the "heart" or start switch 21, you get the length to the top of the "head" and the bottom of the device. The materials are plastic and metal, to help prevent the housing 12 from deteriorating in the liquid.

In some embodiments, as shown in FIGS. 1-3 and 7*a*-7*b*, the device 10 can include a display unit 22 operably connected to the controller 50. The display unit 22 can be disposed on the housing 12 or otherwise viewable through the housing 12. In some embodiments, the display unit 22 can be positioned in the "head" or top of the housing 12. In some embodiments, the display unit 22 can be programmed to display a numerical value 58 corresponding to the entered thickness input provided to the controller 50. As such, in those embodiments including a push button 20 to vary the thickness input provided to the controller 50, the display unit 22 can display the number of times the push button 20 has been depressed. The display unit 22 thus indicates the thickness input at that point, and the push button 20 can, if necessary, be further depressed until the number value 58 associated with the desired thickness input appears on the display unit 22, indicating that the desired thickness input is entered into the controller 50.

Figure 5:
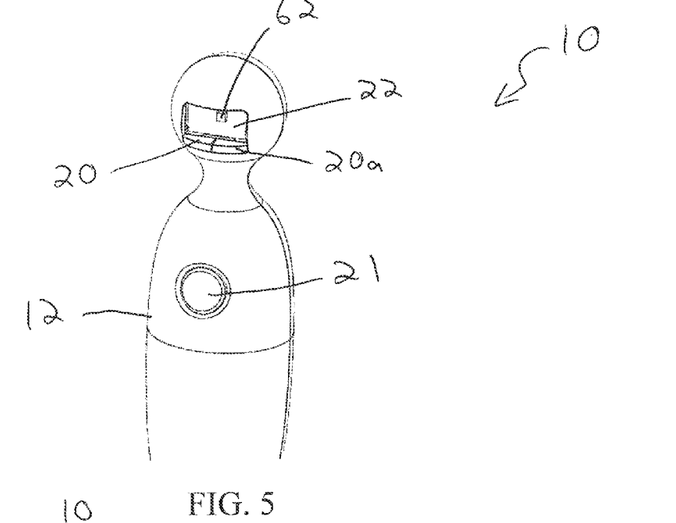
FIG. 5 is a partial detailed view of another embodiment of a thawing device of the present disclosure.

For instance, if a frozen item is measured on the scale 18 and the identified thickness indicia 24 associated with the frozen item is 4, then the user can depress the push button 20 until the display unit 22 shows the numerical value 4 equal to that of the identified thickness indicia 24. As such, the user can readily ascertain that the thickness input entered into the controller 50 is the desired thickness input associated with the identified thickness indicia 24. Once the desired thickness input is reached, the controller 50 can determine the operational time period and the start switch 21 can be actuated such that the controller 50 instructs the motor 26 to rotate the propeller 38 for the operational time period. In some embodiments, the device 10 may include an operational time display button 20*a* operably connected to the controller 50, as shown in FIG. 5. Once the desired thickness input is provided to the controller 50, the operational time display button 20*a* can be depressed, and the controller 50 can be programmed to then determine the operational time period based on the entered thickness input and display the operational time period on the display unit 22. The user can then view the operational time period on the display unit 22 before the start switch 21 is actuated and the thawing process commences.

In some embodiments, the display unit 22 can be illuminated with a variety of different light sources 62, shown in FIG. 5. In some embodiments, the display unit 22 can be an LED or LCD display. In other embodiments, the display unit 22 can be an analog clock face, or a series of lights selectively illuminate in different patterns corresponding to various numbers or letters similar to digital display.

Figure 7A:
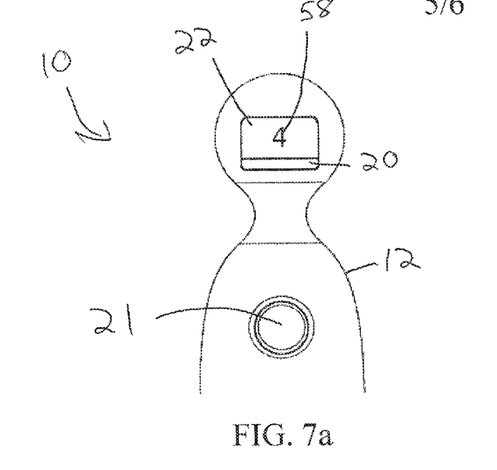
FIG. 7a is a detailed front view of the device of FIG. 1 showing a thickness input value on a display unit on a housing of the device.
Figure 7B:
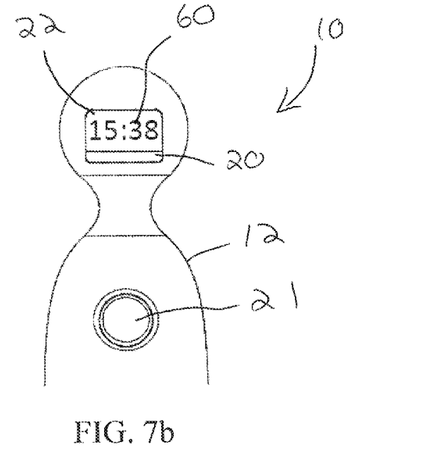
FIG. 7b is a detailed front view of the device of FIG. 1 showing a remaining time value on the display unit.

In some embodiments, the device 10 can be equipped with a countdown timer 60, shown in FIG. 7*b*. The countdown timer 60 can be programmed to calculate a remaining time value from an initial time value equal to the operational time period, the countdown timer 60 programmed to begin calculating the remaining time value once the start switch 21 is actuated. In some embodiments, the display unit 22 can be programmed to display the remaining time value calculated by the countdown timer 60 once the start switch 21 is actuated. As such, a user can enter the desired thickness input into the controller, as shown in FIG. 7*a*. Once the desired thickness input is shown on the display unit 22, the user can actuate the start switch 21, thereby causing the controller to instruct the motor to rotate the propeller to begin the thawing process. The display unit 22 can simultaneously display the remaining time value from the countdown timer 60 to indicate to the user how much time is left in the thawing process.

In some embodiments, the device 10 can include an alert device 52, shown in FIGS. 2 and 4. The alert device 52 can be operably connected to the controller. The controller can be programmed to actuate the alert device 52 at the end of the operational period, or when the countdown timer 60 reaches zero. As such, the alert device 52 can allow a user to enter the thickness input into the controller 50, actuate the start switch 21, leave the container of water unattended with the device 10 circulating the liquid, and then the alert device 52 can provide an alert to the user when the thawing process is complete so that the user does not have to continuously check on the thawing process.

In some embodiments, the alert device 52 can be a speaker or buzzer connected to the controller 50, the controller 50 programmed to cause the speaker to issue an audible alert when the countdown timer 60 reaches zero. The speaker 52 in some embodiments can be positioned within the housing 12, and the housing 12 can include a plurality of holes 52a such that sound from the speakers can escape from the housing 12 and be heard by the user. In other embodiments, the alert device 52 can be in the form of a written message displayed on the display unit 22, such as the word "done," which can provide a visual indication to the user that the thawing process is complete. In still other embodiments, the alert device 52 can be one or more warning lights that can light up once the countdown timer 60 reaches zero to provide a different type of visual indication to the user that the thawing process is complete.

Figure 8:
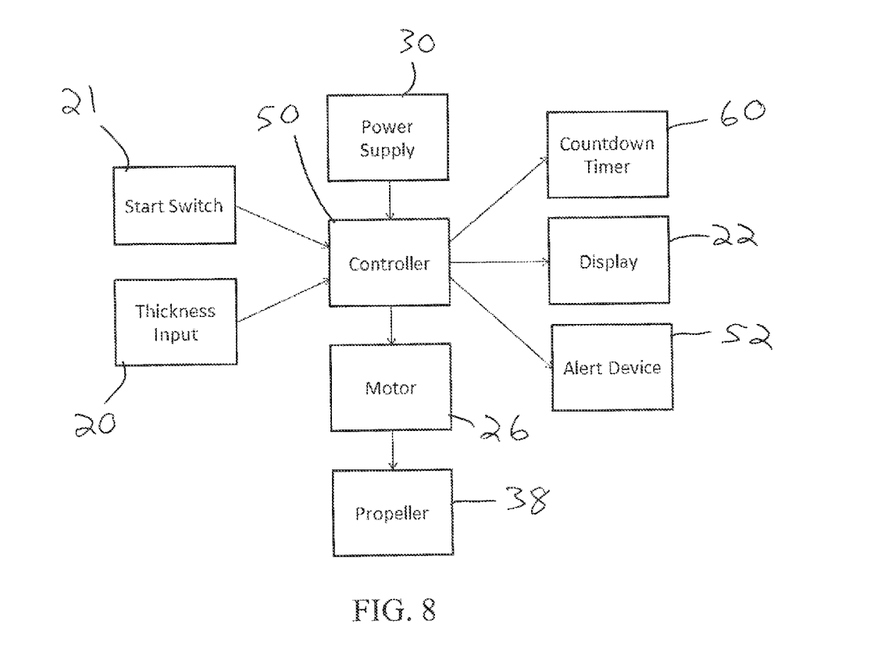
FIG. 8 is a block diagram of various components of the device of FIG. 1.

A block diagram of various components of the device 10 of FIG. 1 is shown in FIG. 8. A thickness input (provided by push button 20) can be entered or provided to the controller 50 corresponding to an identified thickness indicia on the scale of the housing associated with the frozen item. The controller 50 can then relay the current thickness input value to the display unit 22 such that display unit 22 can display the thickness input numerical value. Once the thickness input is correct, the start switch 21 can be actuated causing the controller 50 to determine an operational time period based on the algorithm discussed above or a similar relationship model between the thickness of the frozen item and the thawing time. The controller 50 can supply power from the power source 30 to the motor 26 to instruct the motor 26 to rotate the propeller for the operational time period to thaw the frozen item. The actuation of the start switch 21 also causes the countdown timer 60 to begin calculating a remaining time value, the countdown timer 60 counting down from an initial time equal to the operational time period. The controller can relay the remaining time value to the display unit 22 such that the display unit 22 can display the remaining time value. Once the countdown timer reaches zero, signaling the end of the operational time period, the controller 50 can actuate the alert device 52 to audibly or visually signal to the user that the thawing process is complete.

Figure 9:
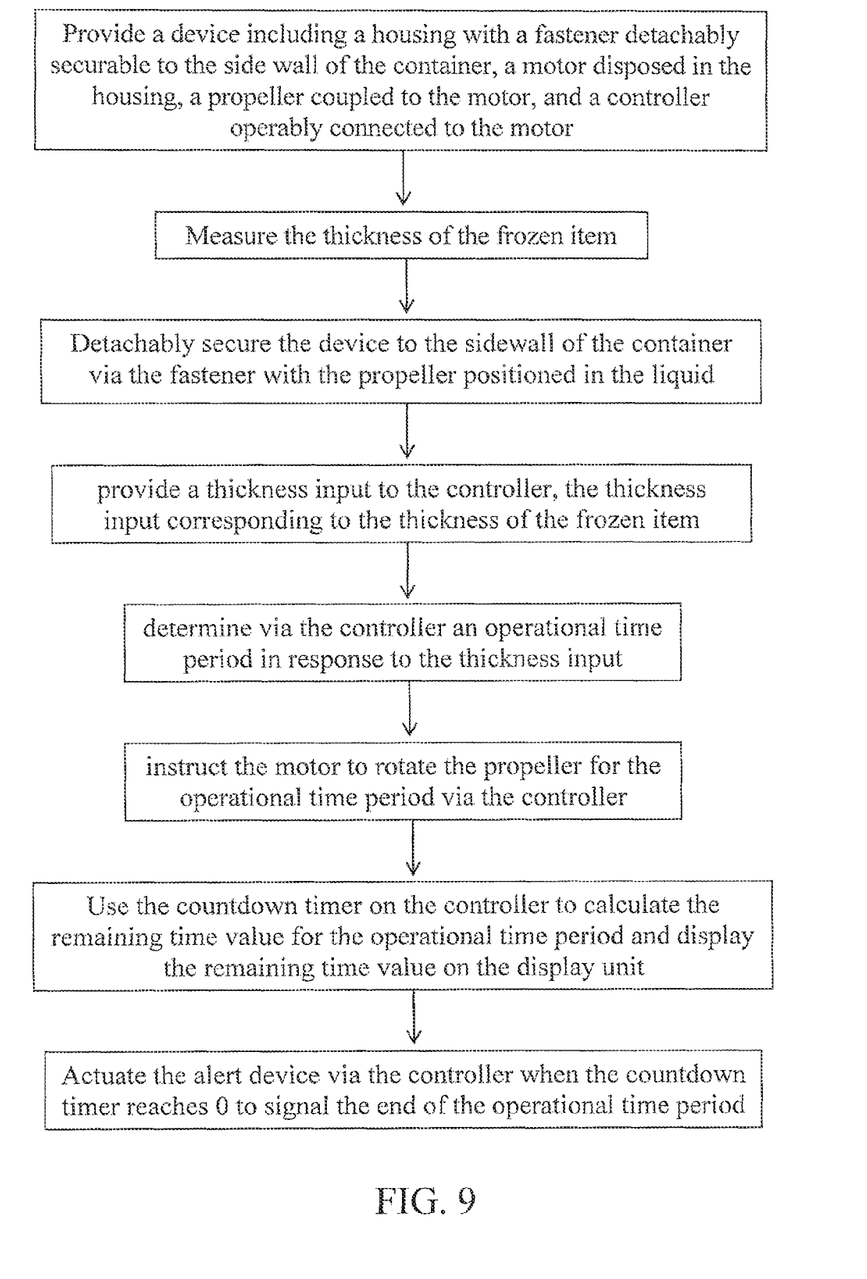
FIG. 9 is a flow chart of a method of thawing frozen items of the present disclosure.

Another aspect of the present disclosure is a method shown in FIG. 9 for thawing a frozen item in a container of liquid, the container having a sidewall, the method including the steps of providing a device including a housing with a fastener detachably securable to the side wall of the container, a motor disposed in the housing, a propeller coupled to the motor, and a controller operably connected to the motor; measuring the thickness of the frozen item; detachably securing the device to the sidewall of the container via the fastener with the propeller positioned in the liquid; providing a thickness input to the controller, the thickness input corresponding to the thickness of the frozen item; determining via the controller an operational time period in response to the thickness input; and instructing the motor to rotate the propeller for the operational time period via the controller.

In some embodiments, the device further includes a thickness scale on the housing, the thickness scale including a plurality of thickness indicia, and the measuring step further comprises measuring the thickness of the frozen item via the thickness scale on the housing. In still other embodiments, the controller further comprises a start switch, and the instructing step further comprises actuating the start switch to instruct the motor to rotate the propeller via the controller.

In some embodiments, the method can further comprise using a countdown timer operably connected the controller to calculate the remaining time value for the operational time period and displaying the remaining time value on a display unit also operably connected to the controller. In still further embodiments, the method can include actuating an alert device when the countdown timer reaches zero to signal the end of the operational period and the thawing process.

Thus, although there have been described particular embodiments of the present invention of a new and useful A Device And Method For Thawing A Frozen Item In A Container Of Liquid, it is not intended that such references be construed as limitations upon the scope of this invention.

What is claimed is:

1. A device for thawing frozen items having a thickness in a container of liquid, the container having one or more sidewalls, the device comprising:
   a housing;
   a motor disposed in the housing;
   a propeller coupled to the motor;
   a fastener extending from the housing, the fastener detachably securable to the side wall of the container, the fastener oriented on the housing such that the propeller is positionable in the liquid when the fastener engages the side wall of the container;
   a controller operably connected to the motor, the controller including a thickness input, the controller programmed to determine an operational time period in response to the thickness input and instruct the motor to rotate the propeller for the operational time period to thaw the frozen item.

2. The device of claim 1, wherein the housing further comprises a scale, the scale including a plurality of thickness indicia for measuring the thickness of the frozen item.

3. The device of claim 2, wherein the controller is programmed with a discrete number of thickness inputs, each thickness input associated with a corresponding thickness indicia on the scale.

4. The device of claim 1, wherein the device further comprises a push button disposed on the housing, the push button operably connected to the controller and selectively depressible to vary the thickness input provided to the controller.

5. The device of claim 1, further comprising a display unit operably connected to the controller, the display unit programmed to display a numerical value corresponding to the thickness input as the thickness input is provided to the controller.

6. The device of claim 1, wherein the housing includes an open bottom section, and wherein the propeller is positioned within the open bottom section such that the propeller disturbs the liquid in the container when propeller is positioned in the liquid in the container and the motor rotates the propeller.

7. The device of claim 1, further comprising a start switch disposed on the housing and operably connected to the controller, the controller instructing the motor to rotate the propeller for the operational time period when the start switch is actuated.

8. The device of claim 7, wherein the controller further comprises a countdown timer programmed to calculate a remaining time value from an initial time value equal to the operational time period, the countdown timer programmed to begin calculating the remaining time value once the start switch is actuated.

9. The device of claim 8, further comprising an alert device operably connected to the controller, the controller programmed to actuate the alert device when the remaining time value reaches zero.

10. The device of claim 8, wherein the apparatus further comprises a display unit operably connected to the controller, the display unit programmed to display the remaining time value once the start switch is actuated.

11. The device of claim 1, further comprising a power source electrically connected to the controller and the motor, the power source providing electrical power to the motor when the controller instructs the motor to rotate the propeller.

12. The device of claim 1, wherein the fastener is a clip extending from the housing, the clip configured to detachably receive the sidewall of the container.

13. The device of claim 1, further comprising a drive shaft extending from the motor, the propeller coupled to the motor via the drive shaft.

14. A device for thawing frozen items in a container of liquid, the container having one or more sidewalls, the device comprising:
    a housing;
    a motor disposed in the housing, the motor including a drive shaft extending from the motor;
    a propeller coupled to the drive shaft;
    a fastener extending from the housing, the fastener detachably securable to the side wall of the container, the fastener oriented on the housing such that when the fastener engages the side wall of the container, the propeller is positionable in the liquid;
    a controller operably connected to the motor, the controller including a thickness input and a start switch, the controller programmed to determine an operational time period in response to the thickness input and instruct the motor to rotate the propeller for the operational time period once the start switch is actuated.

15. The device of claim 14, further comprising a display unit operably connected to the controller, the display unit programmed to display a numerical value corresponding to the thickness input prior to the start switch being activated.

16. The device of claim 14, further comprising a power source electrically connected to the controller and the motor, wherein the controller is programmed to selectively instruct the power source to send pulses of power to the motor.

17. The device of claim 16, wherein the power source is one or more batteries.

* * * * *